(12) United States Patent
Zinda et al.

(10) Patent No.: US 6,393,437 B1
(45) Date of Patent: *May 21, 2002

(54) WEB DEVELOPER ISOLATION TECHNIQUES

(75) Inventors: Eric K. Zinda, Seattle; Zhenglei Pan, Kirkland; David C. Johnson; William E. Hiebert, both of Redmond; Brian R. Marshall, Bellevue; C. Douglas Hodges, Redmond, all of WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/014,036

(22) Filed: Jan. 27, 1998

(51) Int. Cl.$^7$ ............................................. G06F 17/30
(52) U.S. Cl. ........................................ 707/201; 200/203
(58) Field of Search ................................. 707/511, 202, 707/203, 201, 200; 709/219; 395/701, 703; 717/11

(56) References Cited

U.S. PATENT DOCUMENTS

| | | | | |
|---|---|---|---|---|
| 5,155,847 A | * | 10/1992 | Kirouac et al. | 709/221 |
| 5,530,855 A | * | 6/1996 | Satoh et al. | 707/201 |
| 5,600,834 A | * | 2/1997 | Howard | 707/201 |
| 5,729,743 A | * | 3/1998 | Squibb | 707/203 |
| 5,745,906 A | * | 4/1998 | Squibb | 707/203 |
| 5,870,552 A | * | 2/1999 | Dozier et al. | 395/200.49 |
| 5,870,765 A | * | 2/1999 | Bauer et al. | 707/203 |
| 5,881,292 A | * | 3/1999 | Sigal et al. | 707/200 |
| 5,890,170 A | * | 3/1999 | Sidana | 707/501 |
| 5,893,119 A | * | 4/1999 | Squibb | 707/203 |
| 5,924,094 A | * | 7/1999 | Sutter | 707/10 |
| 6,006,239 A | * | 12/1999 | Bhansali et al. | 707/201 |

OTHER PUBLICATIONS

Milburn ("Designing Web Pages with FrontPage 97", New Riders Publishing, 1996, pp. 13–26).*

Microsoft Corporation ("Microsoft Visual SourceSafe Version 5.0: Reviewer's Guide", 1996, pp. 1–27).*

Creech ("Author–oriented Link Management", International World Wide Web Conference, http://www5conf.inria.fr/fich_html/slides/papers/PS4/P11/all.htm, 05/96, pp. 1–6).*

Milburn, "Designing Web Pages with FrontPage 97", New Riders Publishing, pp. 14–15, 18–19, 23–24, & 26, 1996.*

Microsoft Corporation, "Microsoft Visual SourceSafe Version 5.0: Reviewer's Guide", http://www.elsitech.com/vssrg/vssrg.html, pp. 1–27, 1996.*

DelRossi, Robert A., Version Control Meets An Expanding Need (Microsoft's Delta and Intersolv's PVCS Version Manager 5.1.1 Version Control Software), InfoWorld, V16, n25, Jun. 20, 1994, p.93–97.*

Microsoft Delta, Users Guide, Version Control System, Version 1.0 (1993, Microsoft Inc.).*

* cited by examiner

Primary Examiner—Paul R. Lintz
(74) Attorney, Agent, or Firm—Banner & Witcoff, Ltd.

(57) ABSTRACT

A method and apparatus for allowing multiple developers of software applications working in client/server computing network to remotely save, test and debug project files such as web pages. The client computer is capable of emulating server side operations to allow the developer to locally test changes to project files before they are saved on the server. The client computer maintains an accurate view of the overall project, but without having to locally copy the entire software project, by storing file information relating to the software project including, for example, metadata, link information, and BOT replacements, and/or a directory structure of the files and folders in the software project that mirrors the directory structure of the software project on the server. Various features include providing developers with the ability to check out, modify and debug files concurrently with other developers, and merging changes made by different developers to the same file. Concurrently modified files may be merged by prompting a developer when conflicts arise between the files to be merged.

47 Claims, 7 Drawing Sheets

WEB DEVELOPER ISOLATION TECHNIQUES

BACKGROUND OF THE INVENTION

1. Technical Field

In general, the present invention relates to client/server networks, and more particularly to techniques for allowing multiple developers to remotely edit, test and debug software application projects.

2. Related Information

Software applications are commonly developed under a collaborative effort by multiple software developers operating within a client/server computing network. A software application is generally represented by one or more project files. Such files may, for example, comprise web pages which contain hypertext markup language (HTML). These files may link to other files within that same project. For example, linked files may represent web pages that are hyperlinked to the web page for the original project file.

The client/server computing environment allows multiple developers to share these project files and collectively work on and develop an application project. In such a computing environment, the software application (represented by one or more project files under development) is generally stored on the server and is accessed and modified by one or more developers residing at the client computers. A developer at the client computer may work on the software project by creating new files or editing existing files on the server. To edit an existing file, the developer typically obtains a copy of the project file from the server. When a new file is created or an existing file is edited, the developer eventually saves the file directly on the server. In the case where the file is linked to other files, the file is processed to identify any of these linked files which require corresponding modifications. The identified linked files are then also modified in accordance with the changes in the original file. These new or edited files are thereafter made available on the server for further potential development.

Conventionally, changes to project files by developers are typically stored directly on the server. The server also typically identifies the linked files and make corresponding changes to these linked files. Various web page development programs, such as Microsoft's Visual InterDev product, permit developers to create and modify web sites and pages in a central location such as on a server. A web site project, for example, may comprise a plurality of web pages which are linked to each other in various ways so that a user is easily transported between related pages. For large or complex web sites, a large number of files may be involved, with a corresponding complexity in relationships among files.

Present systems, however, do not provide developers with the opportunity to first test and debug the edited and linked files before they are saved on the server. In most cases, the edited files may still require further testing and revising to remove any bugs and errors. Since these files must be saved on the server, however, other developers working on the software project may retrieve and edit these files before these bugs and errors have been corrected. This can result in inconsistent or inoperative software on the server machine while the first user corrects their errors. This can also prevent other developers from continuing their work until the server software project is restored to a consistent state.

Another limitation of present computing systems is that certain developer tasks such as testing and debugging files require the client computer to remain connected to the server. The developer is unable to work on a software project at times where the server is down. Furthermore, in the case where the client computer is a laptop computer, the developer cannot physically detach the computer from the network and still work on the project. Thus, the present computing systems do not adequately allow developers to work on projects remotely or at home.

Yet another limitation discussed above is that present computing systems do not allow multiple developers to concurrently edit the same file(s). Conventional software configuration management tools typically prevent the possibility of two developers simultaneously saving their modifications to the same project file. This limits the potential productivity of developers since only one developer may edit a file at a given time even though the two developers wish to edit different portions of that file.

In addition, problems due to inconsistencies, bugs, and other errors may develop when multiple developers attempt to add or modify files to a large project of interrelated files. For example, consider the case where one developer edits a first file at the same time that a second developer edits a second file, where the first file contains a link to the second file. When the first developer saves the modified first file on the server, the second (linked) file may require corresponding changes (e.g., a reference to the second file must be modified based on change made to the first file). However, since the second developer may still be editing the second file at that time, the second file may not be available to make the corresponding change. Alternatively, when the second developer subsequently saves his/her changes on the server, the first developer's changes to the second file may be erased. In systems which provide automatic updates to links, inconsistent or erroneous results may occur.

SUMMARY OF THE INVENTION

The present invention solves many of the aforementioned problems by providing, in one embodiment, a client computer within an extended client/server computing paradigm, the client computer having an Integrated Development Environment (IDE) that is capable of editing and locally testing project files before they are stored on the server. In this extended model, a client computer includes a working web storage area for storing working copies of project files which make up the software project, a client/server interface for processing communications between the client and the server, and an IDE which provides a user interface for the developer and manages the client/server interface and working web storage. A server computer includes a server extension component for communicating between the server and the client and a master web storage for storing master copies of project files. The present invention may also include a source control system which manages project files that are under source code control.

The present invention allows a developer to locally modify and test one or more project files before they are eventually saved on the server. When a project file is modified and saved on the client computer, corresponding changes are automatically made to any linked files which reside on the client computer. The developer may thereby test and debug the project file and any linked files before the changes are saved on the master copies of these project files on the server. When a project file is ready to be saved on the server, only the project file which was edited by the developer is transferred over to the server. The server thereafter processes the project file to identify the linked files and modifies these linked files in accordance with the changes to the project file. The client computer thereby simulates a computing environment that is similar to that of the server to allow the developer to locally test the project files.

The present invention thereby also allows multiple developers to cooperatively develop software application projects by using the working web concept to allow remote editing, testing and debugging project files on the client computers before they are saved on the server and made accessible to the other developers. In addition, relationships between files are maintained and updated on the client computer so that the developer may completely test all interrelationships before presenting changes to other developers. Further, developers are provided with means for working on project files remotely without a connection to the server. The present invention also allows multiple developers to concurrently retrieve and edit the same file, and includes means for revising an associated or linked file during times that it is being edited by multiple developers. Developers are presented with an intentionally filtered view of project files in order to hide details of the implementation. Developers may thereby view all of the project files regardless of the location and status of the files. Further, the present invention provides means for resolving conflicting changes to files on the server which were made by different developers.

These as well as other novel advantages, details, embodiments, features and objects of the present invention will be apparent to those skilled in the art from following the detailed description of the invention, the attached claims and accompanying drawings, listed herein, which are useful in explaining the invention.

BRIEF DESCRIPTION OF THE DRAWINGS

In the following text and drawings, wherein similar reference numerals denote similar elements throughout the several views thereof, the present invention is explained with reference to illustrative embodiments, in which.

DETAILED DESCRIPTION OF THE PREFERRED EMBODIMENTS

The present invention may be implemented generally within any client/server computing environment suited for allowing multiple developers to develop software applications. For example, various aspects of the invention may be implemented in a document management system or a system where one or more developers are working on files that are interrelated. In this case, when changes to one file are made, corresponding changes may be made to the other related files. These files may then be tested on the client computer before they are saved on the server. More specifically, the present invention may supplement or be implemented within an Integrated Development Environment (IDE). An IDE generally combines into a single integrated software package all of the facilities required to develop a program or an application such as a program editor, a compiler, a debugger and other software development tools. The single computing environment of the IDE is beneficial since a common set of commands can be used. Known IDEs include Visual C++, Visual InterDev and Visual J++ by Microsoft Corporation of Redmond, Wash.

In one embodiment, the present invention may be implemented within the Visual InterDev IDE. Visual InterDev allows web application developers to rapidly build fully interactive, dynamic web sites for intranet, extranet and Internet applications. In Visual InterDev, an IDE project is represented and defined by a collection of project files and project information. The project file(s) may contain information pertaining to a web page in a number of formats including, but not limited to, source code in HyperText Markup Language (HTML), images in Graphics Interface Format (GIF), images in Joint Photographic Experts Group (JPEG), ActiveX—Controls, and other commands. Visual InterDev is described by Ken Miller, Nicholas D. Evans, Kenneth L. Spencer and Eric L. Vincent in "Inside Microsoft Visual InterDev" and is incorporated herein by reference.

Figure 1:
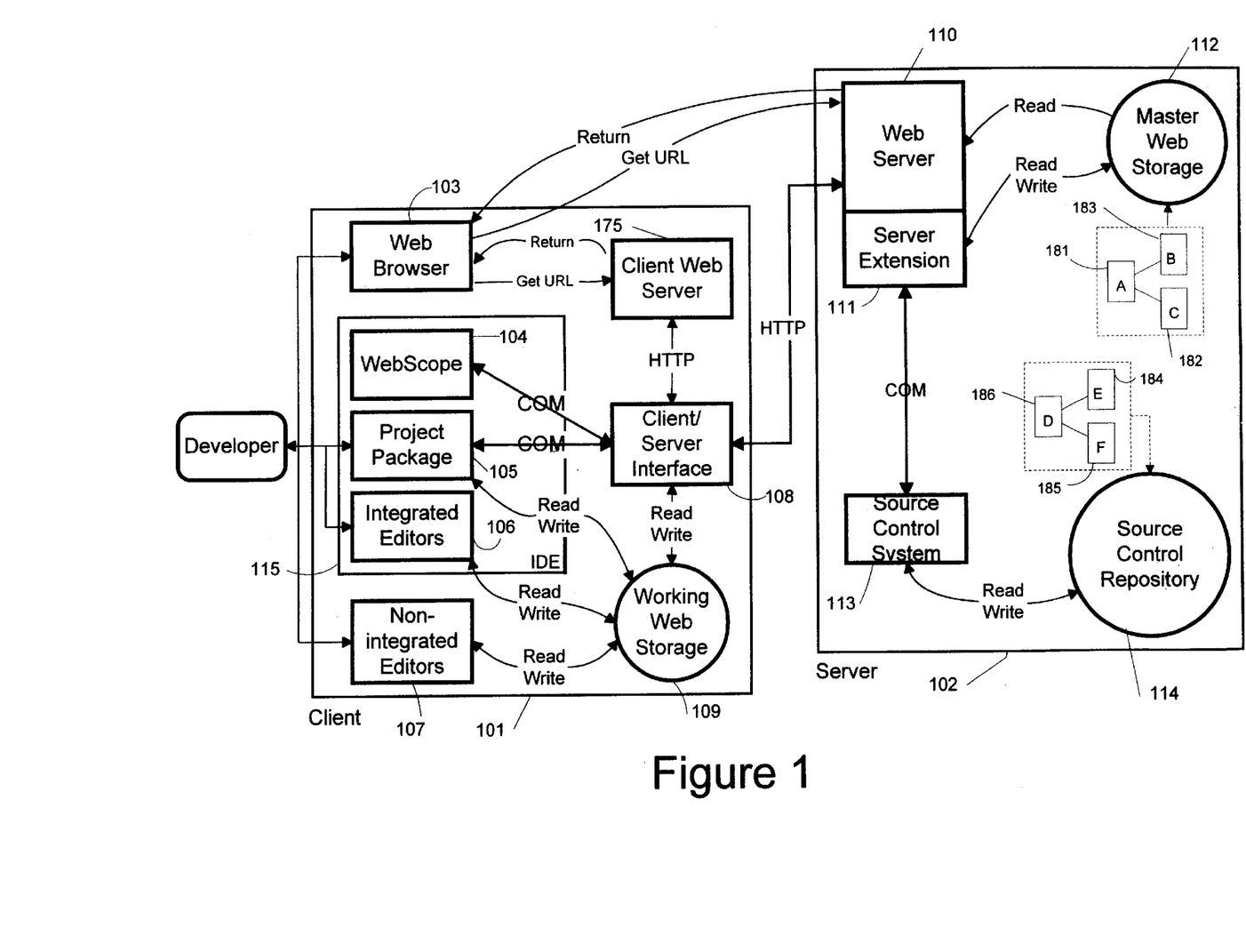
FIG. 1 is a schematic diagram of an exemplary computing environment for implementing the present invention.

FIG. 1 and the following discussion are intended to provide a brief, general description of a suitable computing environment in which the invention may be implemented. Although not required, the invention will be described in the general context of computer-executable instructions, such as program modules. Generally, program modules include routines, programs, objects, scripts, components, data structures, etc. that perform particular tasks or implement particular abstract data types. Moreover, those skilled in the art will appreciate that the invention may be practiced with any number of computer system configurations including, but not limited to, distributed computing environments where tasks are performed by remote processing devices that are linked through a communications network. In a distributed computing environment, program modules may be located in both local and remote memory storage devices. The present invention may also be practiced in personal computers (PCs), hand-held devices, multiprocessor systems, microprocessor-based or programmable consumer electronics, network PCs, minicomputers, mainframe computers, and the like.

FIG. 1 shows an exemplary computing environment for implementing the present invention within an Internet architecture having at least one client computer 101 and a server 102 coupled to the client computer 101. For simplicity purposes, a single client computer 101 is shown in FIG. 1 although a plurality of client computers may be implemented. The present invention may also be implemented within an intranet, extranet, an HTTP-compliant system, an HTTPS-complaint system or any other client/server architecture. In the case of an Internet architecture, each client computer 101 may run, for example, a web browser 103 which is a known software tool used to access the server 102 via a service provider. Server 102 stores information relating to web sites and supports files in the form of documents and pages. The network location of the server 102 is identified by a Uniform Resource Locator (URL) having a known syntax for defining a network connection.

Although client computer 101 and server 102 perform processes which are operative within two computer systems, these processes being generated from a high level programming language (e.g., PERL, C++ or Java), which is interpreted and executed in a computer system at runtime (e.g., a workstation), it can be appreciated by one skilled in the art that they may be implemented in a variety of hardware devices, either programmed or dedicated.

Server 102 of FIG. 1 includes a web server 110, a server extension 111 and a master web storage 112. Although not required, the server may also include a source control system 113 and a source control repository 114. The web server 110 is operatively connected to interact with a web browser 103 and a client/server interface 108 of the client computer 101. The web server 110 may include, for example, an Internet Information Server (IIS). for Windows NT or Personal Web Server for Windows '95 licensed by Microsoft Corporation.

The client computer 101 may access information stored on the web server 110 via its web browser 103 or its client/server interface 108 using an HTTP-compliant protocol. Web server 110 is operatively connected to read files from the master web storage 112, a memory device which contains master copies of project files of an application project. The project files may be source files having any variety of formats such as, for example, C++ or Java source code or HTML text. Project files are stored in the master web storage 112 in a master directory structure. Such directory structures for files are widely used in software applications. The present invention may also be implemented within systems utilizing other storage structures including but not limited to, systems utilizing relational databases.

Server extension 111 is coupled to read and write project files on the master web storage 112. Server extension 111 generally handles server-side operations for processing requests by the client computer 101 that are not handled through the standard web browser interface including, for example, retrieving and storing one or more project files. The server extension 111 also serves to edit project files that are linked to or referenced in a project file that is saved on the server. The server extension 111 may be coupled to the web server 110 via an ISAPI connection.

Source control system 113 is operatively coupled to the server extension 111 and coupled to read from the source control repository 114. The source control system 113 allows source code controlled files to be checked into and out of the source code repository 114. In one embodiment, the source control system 113 and the source control repository 114 may comprise Microsoft Visual SourceSafe licensed by Microsoft Corporation of Redmond, Wash. The source control system 113 serves to provide a method of controlling files that require source code control. The source control system repository 114 provides a listing of those files which are under source code control.

Source control repository 114 and master web storage 112 contain copies of the project. Files within the project may be linked to one another such that information within one file may link to information within another file. For example, in the instance where the files represent web pages of a web project, one file may link to the file name of another file. Thus, a user previewing the web page represented by that file may point and click on a hyperlink to access the other web page represented by the linked files. Master web storage 112 contains, for example, file A 181 which is linked to files B 183 and C 182. Source control repository 114 contains, for example, file D 186 which is linked to files E 184 and F 185. Files D, E and F (186, 184 and 185 respectively) are under source code control while files A, B and C (181, 183 and 182 respectively) are not under source code control. As described in further detail below, a change in files B 183 or C 182 may require a corresponding change in A 181. In the case where the filename of B 183 is changed to B', file A 181 may need to be changed to link to B' rather than B 183.

Client computer 101 of FIG. 1 includes an IDE 115, a web browser 103, a client/server interface 108, a working web storage 109 and non-integrated editors 107. The client computer 101 optionally may also include a client web server 175. Web browser 103 is generally a computer program which allows the client computer 101 to access information over the Internet, an intranet or any other HTTP-compliant network. In this case, the web browser 103 is capable of accessing information on the web server 110.

In one embodiment, the IDE 115 may comprise a modified version of Microsoft's Visual InterDev 1.0 or, alternatively, Visual InterDev 2.0. The IDE 115 generally includes a linkview 104, a project package 105 and integrated editors 106. Linkview 104 is generally a tool for viewing links to web pages. Project package 105 is an add-on package for the IDE 115 that manages the project files and other items within the project. The project package 105 manages, for example, the checking in and checking out of project files. Integrated editors 106 are generally content editors integrated into the IDE 115 which allow the developer to edit HTML or script source code within a file. Non-integrated editors 107 are external programs for editing file that are not integrated into the IDE 115.

Client/server interface 108 generally provides a means for the IDE 115 to manipulate, retrieve and edit project files from the server 102 via an HTTP protocol. The client/server interface 108 performs client side project operations and makes requests to the server extension 111 for server side operations. Client side operations performed by the client/server interface 108 complement those operations performed by the server extension 111 including, for example, retrieving copies of files, saving files, checking in and checking out project files, renaming files and deleting files.

Client/server interface 108 is operatively coupled to communicate with the IDE 115. The project package 105 drives the client/server interface 108 to perform various operations. The client/server interface 108 is also coupled to read and write project files into working web storage 109.

Working web storage 109 is a memory device used for previewing, browsing metadata about the project and managing most of the changes that a developer makes to files in a project. The working web storage 109 includes a local directory structure of files and folders that generally mirrors the master directory structure of the master web storage 112. When project files are retrieved or checked out for editing by the client computer 101, these files are stored in the working web storage 109. The working web storage 109 may also contain Read-Only copies of project files as well as new files created by the developer but that are not on the server 102 (referred to henceforth as "orphaned files"). The working web storage 109 also contains local files necessary to a web project including, for example, a workspace file, an options file and a project file. All of these files are represented in the working directory of the working web storage 109.

The working web storage 109 is preferably a disk-based web such that the IDE 115 and the web browser 103 may, under circumstances described herein, look to the working web storage 109 for file information rather than going to the server to obtain file information. Advantageously, the disk-based feature of the working web storage 109 allows the developer at the client computer 101 to work without a connection to the server 102 since any required information to edit project files such as metadata, link information, and BOT replacement would be stored locally in the working web storage 109. Link information provides information relating to project files that are linked to the given project file. A BOT replacement is a tag within a file which corresponds to a piece of code. The tag notifies the server extension 111 to run that code for purposes of modifying the file. An example of a BOT replacement is a table of contents which instructs the server extension 111 to generate a table of contents when the file having the BOT replacement is checked into the server 102. BOT replacements usually construct HTML that depends upon the content of other files in the project and therefore need to be changed when dependent files are changed.

As described in further detail below, when a project is initially accessed by a developer, the IDE 115 creates a local directory structure in the working web storage 109 which mirrors that of the project files stored in the master web storage 112 on the server 102 and caches metadata about the files that are in the project. Generally, metadata is information about a file that is not part of the file. Examples of metadata are date information (e.g., when the file was last modified) or developer identification (e.g., who last modified the file). The metadata is typically managed by the client/server interface 108 and server extension 111.

In order to synchronize working web storage 109 with master web storage 112 of server 102, a local cache (not shown) on client computer 101 tracks various information about the files in the working web storage 109 including, but not limited to, metadata, the status of the files and which files were on the master web storage 112 the last time that the working web storage 109 was synchronized with the master web storage 112.

Figure 2:
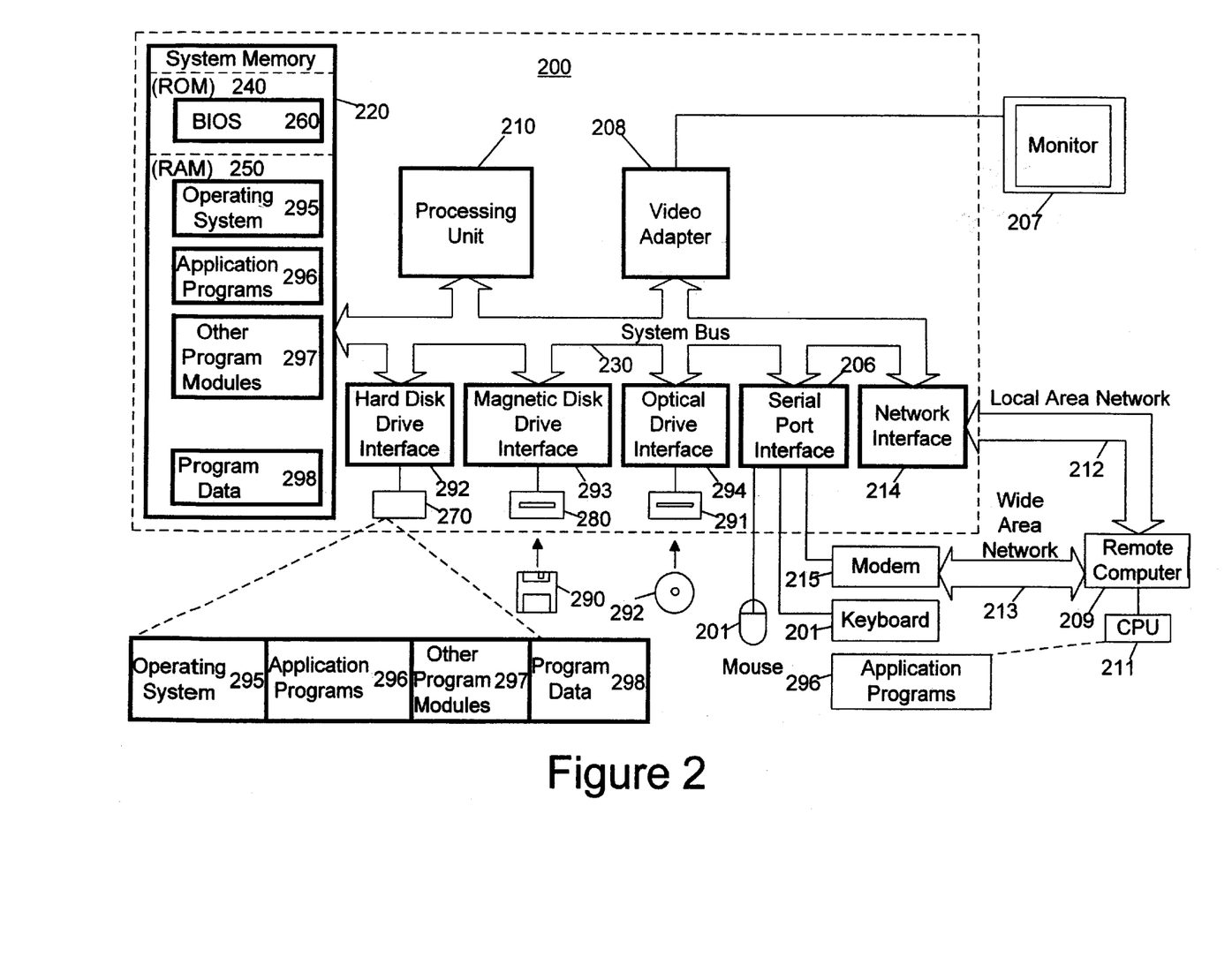
FIG. 2 is a schematic diagram of a client computer in accordance with the present invention.

As shown in FIG. 2, the client computer 101 is typically a general purpose computing device in the form of a conventional personal computer 200, including a processing unit 210, a system memory 220, and a system bus 230 that couples various system components including the system memory to the processing unit 210. The system bus 230 may be any of several types of bus structures including a memory bus or memory controller, a peripheral bus, and a local bus using any of a variety of bus architectures. The system memory includes read only memory (ROM) 240 and random access memory (RAM) 250.

A basic input/output system 260 (BIOS), containing the basic routines that help to transfer information between elements within the personal computer 200, such as during start-up, is stored in ROM 240. The personal computer 200 further includes a hard disk drive 270 for reading from and writing to a hard disk, not shown, a magnetic disk drive 280 for reading from or writing to a removable magnetic disk 290, and an optical disk drive 291 for reading from or writing to a removable optical disk 292 such as a CD ROM or other optical media. The hard disk drive 270, magnetic disk drive 280, and optical disk drive 291 are connected to the system bus 230 by a hard disk drive interface 292, a magnetic disk drive interface 293, and an optical disk drive interface 294, respectively. The drives and their associated computer-readable media provide nonvolatile storage of computer readable instructions, data structures, program modules and other data for the personal computer 200.

Although the exemplary environment described herein employs a hard disk, a removable magnetic disk 290 and a removable optical disk 292, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 290, optical disk 292, ROM 240 or RAM 250, including an operating system 295, one or more application programs 296, other program modules 297, and program data 298. A user may enter commands and information into the personal computer 200 through input devices such as a keyboard 201 and pointing device 202. Other input devices (not shown) may include a microphone, joystick, game pad, satellite dish, scanner, or the like. These and other input devices are often connected to the processing unit 210 through a serial port interface 206 that is coupled to the system bus, but may be connected by other interfaces, such as a parallel port, game port or a universal serial bus (USB). A monitor 207 or other type of display device is also connected to the system bus 230 via an interface, such as a video adapter 208. In addition to the monitor, personal computers typically include other peripheral output devices (not shown), such as speakers and printers.

The personal computer 200 may operate in a networked environment using logical connections to one or more remote computers, such as a remote computer 209. The remote computer 209 may be another personal computer, a server, a router, a network PC, a peer device or other common network node, and typically includes many or all of the elements described above relative to the personal computer 200, although only a memory storage device 211 has been illustrated in FIG. 2. The logical connections depicted in FIG. 2 include a local area network (LAN) 212 and a wide area network (WAN) 213. Such networking environments are commonplace in offices, enterprise-wide computer networks, intranets and the Internet.

When used in a LAN networking environment, the personal computer 200 is connected to the local network 212 through a network interface or adapter 214. When used in a WAN networking environment, the personal computer 200 typically includes a modem 215 or other means for establishing a communications over the wide area network 213, such as the Internet. The modem 215, which may be internal or external, is connected to the system bus 230 via the serial port interface 206. In a networked environment, program modules depicted relative to the personal computer 200, or portions thereof, may be stored in the remote memory storage device. It will be appreciated that the network connections shown are exemplary and other means of establishing a communications link between the computers may be used.

Under the computing environment of the present invention as described in FIG. 1, a developer at client computer 101 may retrieve and remotely edit and test project files without affecting the project files on the server 102. The client computer 101 provides similar processing capabilities of the project files as would be available on the server 102. Advantageously, this allows the developer to isolate within the client computer 101 the developer's changes to the project files. The client computer 101 identifies any linked files to the edited project file and fixes-up or revises any copies of these linked files which reside in the client computer in accordance with the developer's changes to the project file. The client computer 101 thereby provides a run-time environment so that the edited project file (by the developer) and the fixed-up file(s) (by the client computer 101) may be locally tested on the client computer 101. Link fix-ups are described in further detail below. BOT replacements may be run locally when files are changed so that all dependent changes can be made and tested locally before the developer checks in the edited file. This allows the developer to properly debug the edited file before it is checked in. The client computer 101 performs the same BOT functionality that would occur on the server 102 when the files are checked in. When a file is ready to be checked in, only the file which was edited by the developer needs to be checked-in. The server 102 processes the edited file at check-in to identify any linked files and fixes-up or make any necessary changes to the linked files.

In one embodiment, a developer works within an IDE 115 to practice the invention. The IDE 115 contains a project window which lists the directory structure of the project files for a given project. The directory structure provides the project files contained within the working web storage 109 and the master web storage 112. Any modifications to the directory structure due to changes in files in the working web storage 109 are automatically reflected in the project window, which is managed by project package 105. However, even though the directory structure reflects any changes to project files, one embodiment of the invention delays making changes to project files in the master web storage 112 until a special command is entered by the developer. In one embodiment, modifications in master web storage 112 are not reflected in the project window unless a refresh command, described below, is performed.

When a new project is created and a local directory for the project file is chosen, the root directory of the working web storage 109 is preferably one level under the local directory, using the same name as the project and appending "_Local" after it. For example, if the project is named MY PROJECT under the local directory "C:\Projects", the following structure would result:

| | |
|---|---|
| Project File | C:\Projects\MyProject\MyProject.vip |
| Root directory of working web storage 109 | C:\Projects\MyProject\MyProject_Local\* |

Figure 3:
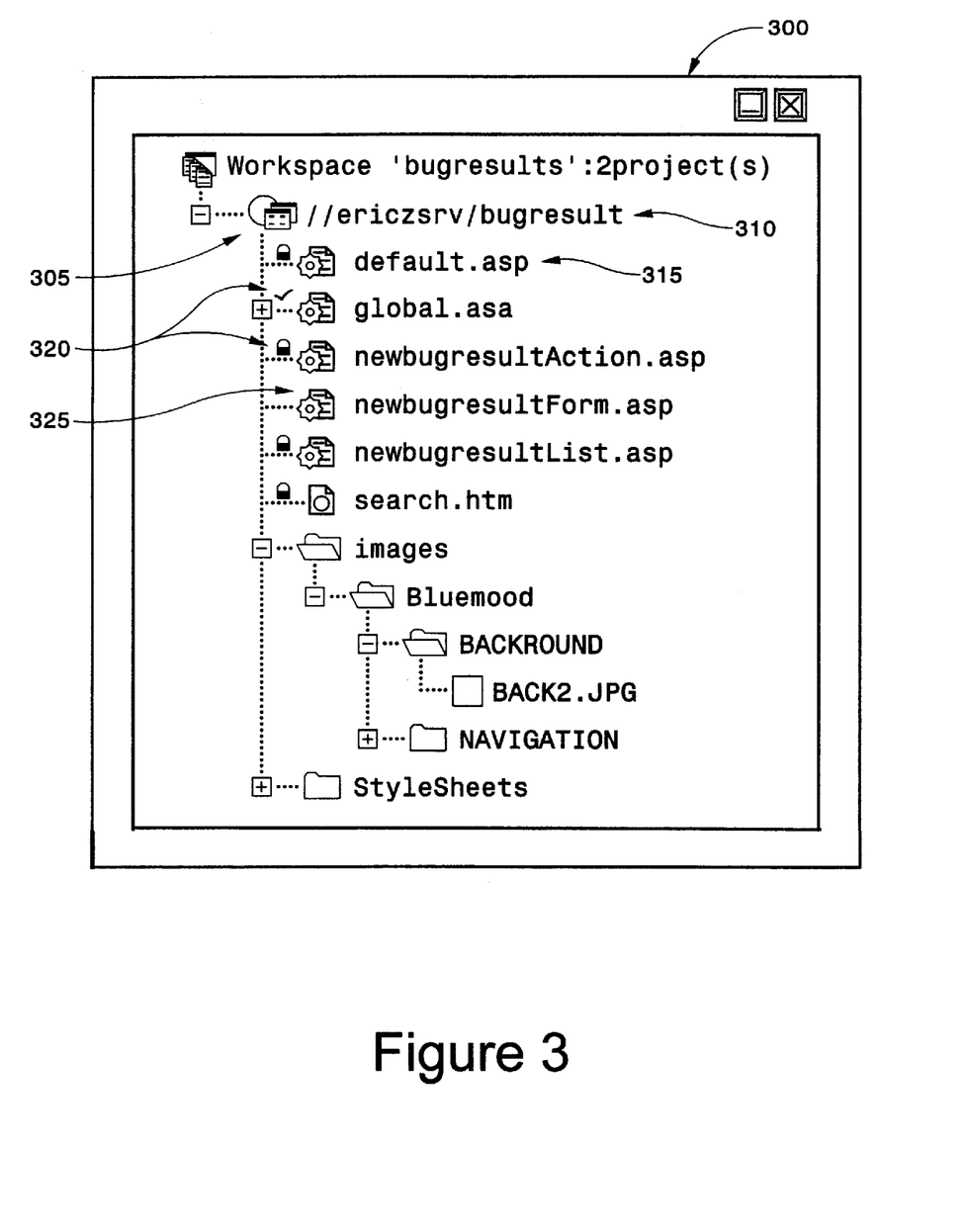
FIG. 3 depicts an example of a project window in accordance with the present invention.

FIG. 3 depicts an example of a project window 300 in accordance with one embodiment of the present invention. The project window 300 identifies a project and lists the files associated with that project. The project itself is identified by a project name 310 and a project glyph 305. Each project file within the project is identified by a file name 315 and one or more file glyphs 320 and 325.

In accordance with one aspect of the invention, developers may develop projects in a direct mode (i.e., connected to the server), an isolated mode (i.e., avoiding use of the server to access files), or an offline mode (i.e., entirely unconnected to the server). These modes are described in more detail herein. The project glyph 305 indicates the mode of operation in which the developer is accessing a project: i.e., whether the client computer 101 is operating in the direct mode, isolated mode, or offline.

The file glyphs 320 and 325 also provide information relating to the status and type of each file. In one embodiment, each file may be represented by two file glyphs. One file glyph 325 may indicate the type of file, for example, a folder, a web page, an active server page (ASP), or an HTML page. The other file glyph 320 may indicate the status of the file, for example, to indicate whether the file is ghosted, under source control, orphaned, checked out, read-only, or a working version. In the case where a file is added to the working web storage 109 but not in the master web storage 112, the existing file is marked as an orphaned file.

In the case where a file exists on the master web storage 112 but not in the working web storage 109, the file is added to the local directory as a ghosted file. Alternatively, icons instead of glyphs may be used to represent the status and type of the files.

It is contemplated that files can be indicated as being "checked out" at the server extension level 111 and/or at the source code control level 113. It is also contemplated that files can be checked-out (for editing) or retrieved as read-only (for previewing and/or fix-ups). In some cases, files are retrieved from master web storage 112 and provided to a developer, and in other cases files are retrieved using source code control system 113 (i.e., some files are under source code control while others are not). It is also contemplated that a developer may wish to check out a file on an exclusive basis (i.e., preventing other developers from checking out the file but not from reading the file) or a non-exclusive basis (i.e., permitting other developers to also check out the file). The following explains one approach for implementing various scenarios involving multiple developers checking out files in the system of FIG. 1.

In a first case, assume that a file is not under source code control (i.e., not managed by source control system 113), but is instead merely stored in a project area in master web storage 112. If a developer seeks to check out the file, server extension 111 transmits to the developer a copy of the file from master web storage 112. The file is then stored in working web storage 109 on the developer's client computer and can be modified as the developer sees fit. If the file is not under source code control, the developer may not obtain exclusive access to the file. Accordingly, other developers may freely retrieve and modify copies of the file even if the file was previously retrieved by another developer.

In a second case, assume that a file has not been checked out, but is under source code control (i.e., the file is stored in source control repository 114 and controlled by source control system 113). If the developer requests non-exclusive access to the file, server extension 111 retrieves a copy of the file from source control system 113 and provides the copy to the developer. The source control system 113 designates the file as a non-exclusive check-out. If the developer requests exclusive access, an exclusive check-out is performed by the source control system 113.

In a third case, suppose a file has already been checked out to a first developer, but the file is not source code controlled by the source control system 113, and a second developer requests non-exclusive use of the file. In this situation, server extension 111 will retrieve a non-exclusive copy of the file from master web storage 112 and provide it to the second developer for use at the developer's client computer (i.e., working web storage 109 on a second client computer).

In a fourth case, suppose a file has already been checked out to a first developer on a non-exclusive basis, and the file is source code controlled. If the second developer wants non-exclusive use of the file, server extension 111 will retrieve a copy of the file from the source code control repository 114 (through source control system 113) and provide the copy to the second developer. If the second developer wants exclusive use of the file, a non-editable copy is provided but the exclusive use request will not be granted. In another embodiment, where a first developer has checked out file exclusively, the check out by the second developer may actually fail. The second developer may then request a read only copy of the file.

In a fifth case, assume a source code controlled file has already been checked out to a first developer on an exclusive basis. Subsequent developers may only obtain read-only versions of the file.

The above cases are summarized in the table below with the horizontal columns designating the desired action of the developer and the vertical rows reflecting the status of the project file (whether the file is checked-out and/or under source code control (SCC)):

|  | Developer wants non-exclusive check-out | Developer wants exclusive check-out | Developer wants read-only |
|---|---|---|---|
| File with no SCC | Copy sent to client | Option not available for no SCC files | Read-only copy sent to client |
| File not checked-out (SCC) | Copy sent to client; non-excl. check-out | Copy sent to client; exclusive check-out | Read-only copy sent to client |
| File checked-out (Exlusive-SCC) | Read-only copy sent to client; no check-out | Read-only copy sent to client; no check-out | Read-only copy sent to client |
| File checked-out (Non-exclusive-SCC) | Copy sent to client | Read-only copy sent to client; no check-out | Read-only copy sent to client |

Various symbols or glyphs 320 can be provided on a display to each developer which indicates the status of various files. For example, as shown in FIG. 3, certain files are shown as being under security and not checked out by the developer (lock symbols), and others are shown as being checked out (check mark symbols), indicating that this developer or another developer may be making modifications to the file. In various embodiments, details of the physical file locations are hidden from the developer, and the underlying software takes care of retrieving files from the appropriate location in the system. Thus, each developer can be given the illusion that the entire software project is locally stored on the developer's client computer, even though the underlying software may require access of the server 102 to retrieve some of the files.

Figure 4:
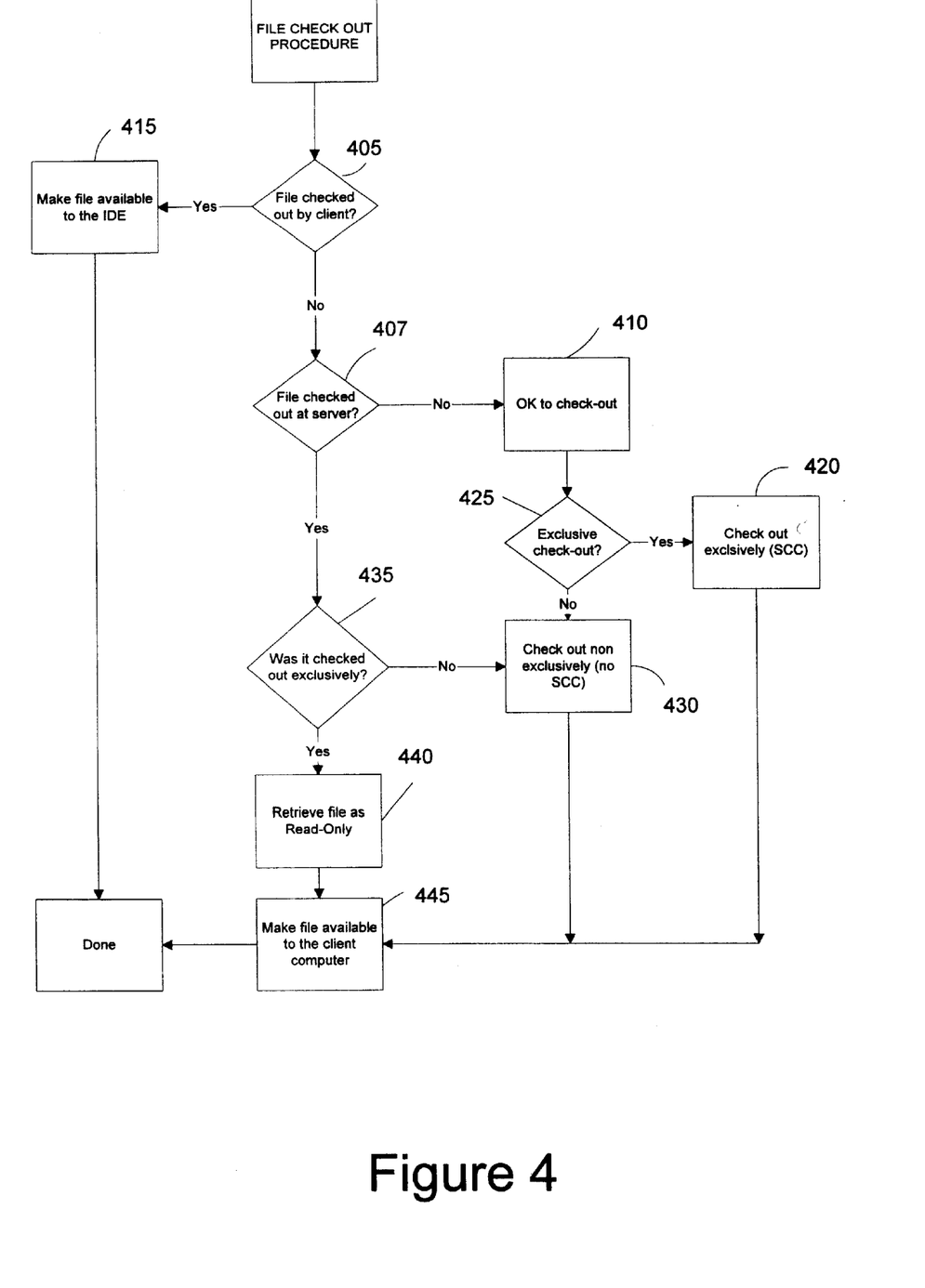
FIG. 4 is a flow chart diagram demonstrating a procedure for checking out a project file.

When a developer wishes to edit an existing project file having source code control, the developer must check out the file from the server 102. FIG. 4 shows steps which can be implemented in accordance with the above description. The developer checks out a file by issuing a check out command in the project window 300. Beginning in step 405, project package 105 first determines the status of the project file. If the file has already been checked out to that developer, then in step 415 the file is retrieved from the working web directory 109 and is made available for editing by editors 106 and 107.

If the file is not checked out to the developer, then project package 105 issues a request to the client/server interface 108 to check out the project file from the master web storage 112. The project package 105 may also provide instructions as to whether the developer wishes that file be checked out exclusively. The client/server interface 108 in response gathers necessary parameters to establish a function call to the web server 110 via HTTP protocol.

At step 407, the request is forwarded to the server extension 111 which queries the source control system 113 to determine whether the requested file has already been checked out to another developer. If the file has not been checked out, the file may be checked out (step 410) from the server. Server extension 111 obtains a copy of the file from the master web storage 112. At step 425, the type of check-out is determined whether it is to be exclusive or non-exclusive. If the developer's request was for an exclusive check out, the file is checked out exclusively at step 420. On the other hand, if the developer did not request an exclusive check out, the file is checked out from master web storage 112 by server extension 111 on a non-exclusive basis, at step 430.

At step 435, the server extension performs a check to determine whether the requested file was checked out exclusively. If the file was exclusively checked out, the check-out fails and the developer may be asked if a read-only copy is desired. At step 440, if a read-only copy is desired, the server extension 111 sends a request to the source control system 113 to retrieve a read-only version of the file from the source control repository 114. This step may alternatively be performed automatically. At step 430, if the file was not checked out exclusively, the file is checked out again and the source control system 113 marks it as such.

At step 445, a copy of the requested file is transferred to the client computer 101. Server extension 111 thereafter transfers through web server 110 a copy of the file, regardless of whether it is checked out or read-only, to client/server interface 108 via HTTP protocol. The client/server interface 108 then stores the file in the indicated location in the working web storage 109 and signals the project package 105 that the requested file has been retrieved. Project package 105 thereafter launches an editor 106 or 107 and opens the file within the editor 106 or 107. The developer may now make changes to a project file that is not read-only. Linked files may also be retrieved in a manner identical to that described above. In addition, the developer may also request read-only copies of files under similar procedures.

The above discussion assumes that a developer is coupled to server 102 through a client/server interface such as through an HTTP-compliant protocol. To practice the present invention, the developer at the client computer 101 works in an isolated mode whereby the developer may edit a project file and locally save, test and debug the file without saving it on the master web storage 112 and without having it made accessible to other developers.

Under an isolated mode of operation, a project file which is retrieved for editing is saved in working web storage 109. Any changes that are made to that file are also stored on the working web storage 109. The client computer 101 thereby may compile or process the edited file to identify any linked files and make the corresponding changes to any copies of linked files which are available locally. The client computer 101 may also perform any BOT processing. If the developer seeks to test the project file or files, the developer would select a "preview" command in web browser 103 to preview web pages represented by the file or files that are stored in the working web storage 109.

In isolated mode, web browser 103 is configured to communicate with the working web storage 109 to preview web pages whose files are stored therein. If the developer seeks to preview a linked web page to the previewed web page and if the files representing the linked web page are stored on the working web storage 109, the linked web page may be previewed by the web browser 103. The developer may thereby test their changes to the file by viewing the edited web page and the hyperlinked web pages which were also changed. If, on the other hand, the files representing the linked web page are not stored on the working web storage 109, the linkview 104 may retrieve linking information from cached information on the client computer 101 and/or the meta information in the working web storage 109 to determine whether the files representing the linked web page need to be changed to account for the changes to the original web page. In order to preview a web page, the client 101 must have a local copy of the associated files in the working web storage 109.

In other words, the developer is automatically provided with copies of files stored in working web storage 109 and only in the case where a linked file is needed is the server 102 contacted to supply a file. Moreover, in isolated mode, files are only returned to server 102 when they are "checked in", not when they are saved. In contrast, when operating in direct mode, saving a file causes the file to be saved directly to the server (either into master web storage 112 or source control repository 114).

Once the developer is satisfied with changes made to files on the client computer, the developer may choose to have the modified files stored in master web storage 112 using a check in procedure. The developer instructs project package 105 via project window 300 to check in the file. The project package issues the appropriate command to the client/server interface to retrieve the file from the working web storage 109 and transfer the file to the web server 110 via HTTP protocol. The file is transferred to server extension 111 where it is checked in to the master web server 112. The check in procedure compiles the file and any linked files. Thus, any corresponding changes that are required on the linked files are also made at the server 102 before the files are saved on the master web server 112.

The file may also be designated by the developer to be under source code control. In this case, server extension 111 notifies source control system 113 and stores the file in source control repository 114. Project package 105 is then notified through the client/server extension 108 that the file has been checked in. The directory for the project is thereby updated to reflect the fact that the file is now checked in and that a local copy does not exist on the working web storage 109.

Figure 5:
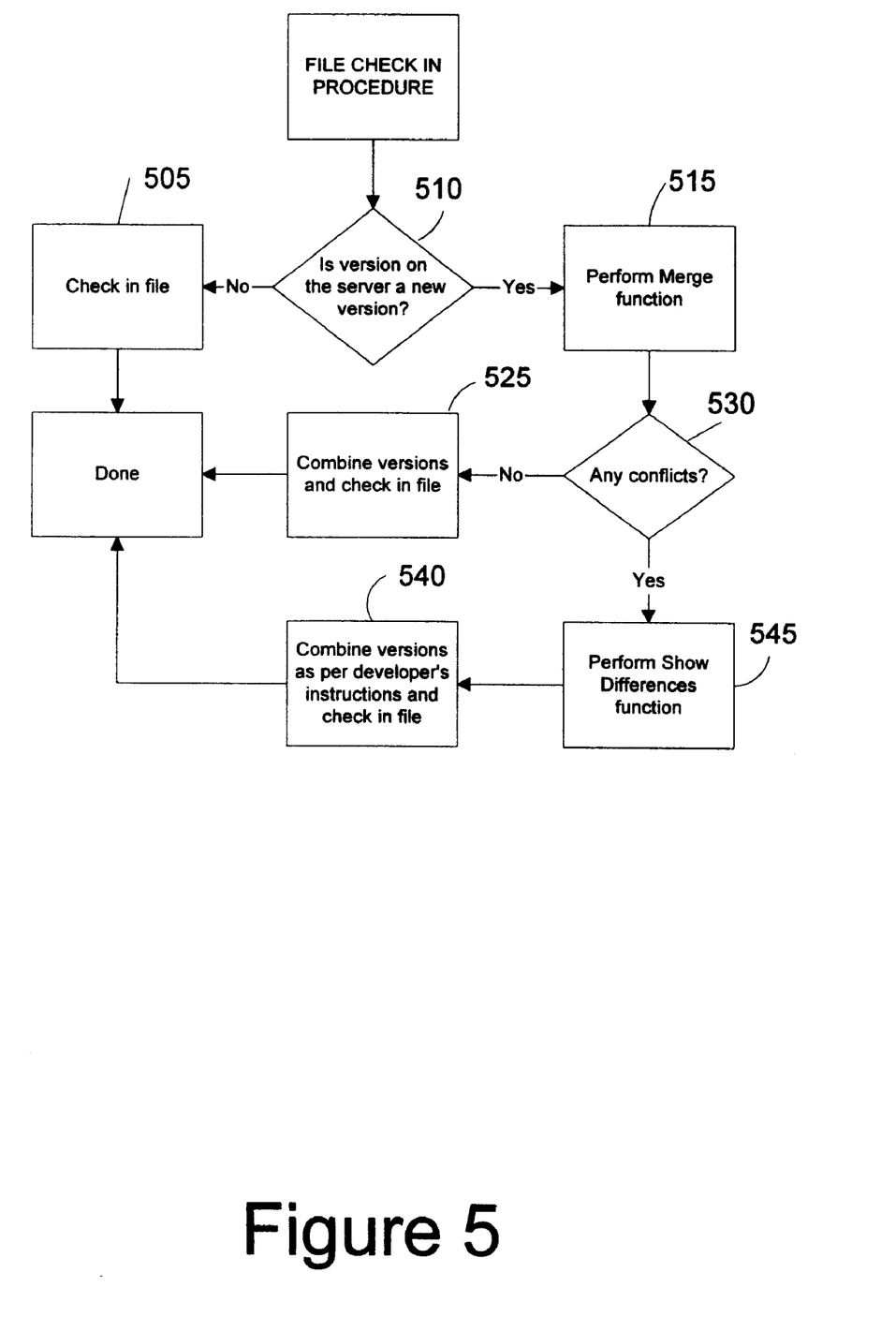
FIG. 5 is a flow chart diagram demonstrating a procedure for checking in a project file.

FIG. 5 depicts a flow chart of procedures for checking in a file within the server 102. At step 510, when a file is ready to be checked in, a test is made to determine whether a later version of the file exists in master web storage 112 than the version that existed when the file was checked out. At step 505, in the case where a later version does not exist, the file is marked as checked in and saved in master web storage 112 and/or in the source control repository 114.

A later version of the file may, however, exist in master web storage 112. This situation may arise where a file is concurrently checked out by more than one developer. When both developers check in their edited versions of the file, the files may then need to be merged at check in. The developer who first checks in the edited file may do so under procedures previously described since a newer version of the file does not yet exist on the master web storage 112.

However, when a subsequent developer checks in the same file, a newer version does exist from the time that the file was originally checked out by the subsequent developer. In this case, at step 515, a merge function can be performed to combine the revisions to the file by both developers. The merge function is triggered when a developer attempts to save or check in a file on the server 102 and a newer version of the file already exists as compared to the file that was originally checked out by the developer. At step 530, the newer version saved on the server 102 is first downloaded to project package 105 via the client/server interface 108 and compared with the version saved in working web storage 109 for any conflicting changes by the developers. At step 525, in the case where there are no conflicts, namely that the changes by the developers pertain to different parts of the same file, the project package 105 automatically combines the changes by both developers and prompts to developer to check-in the merged file to the server 102.

Figure 6:
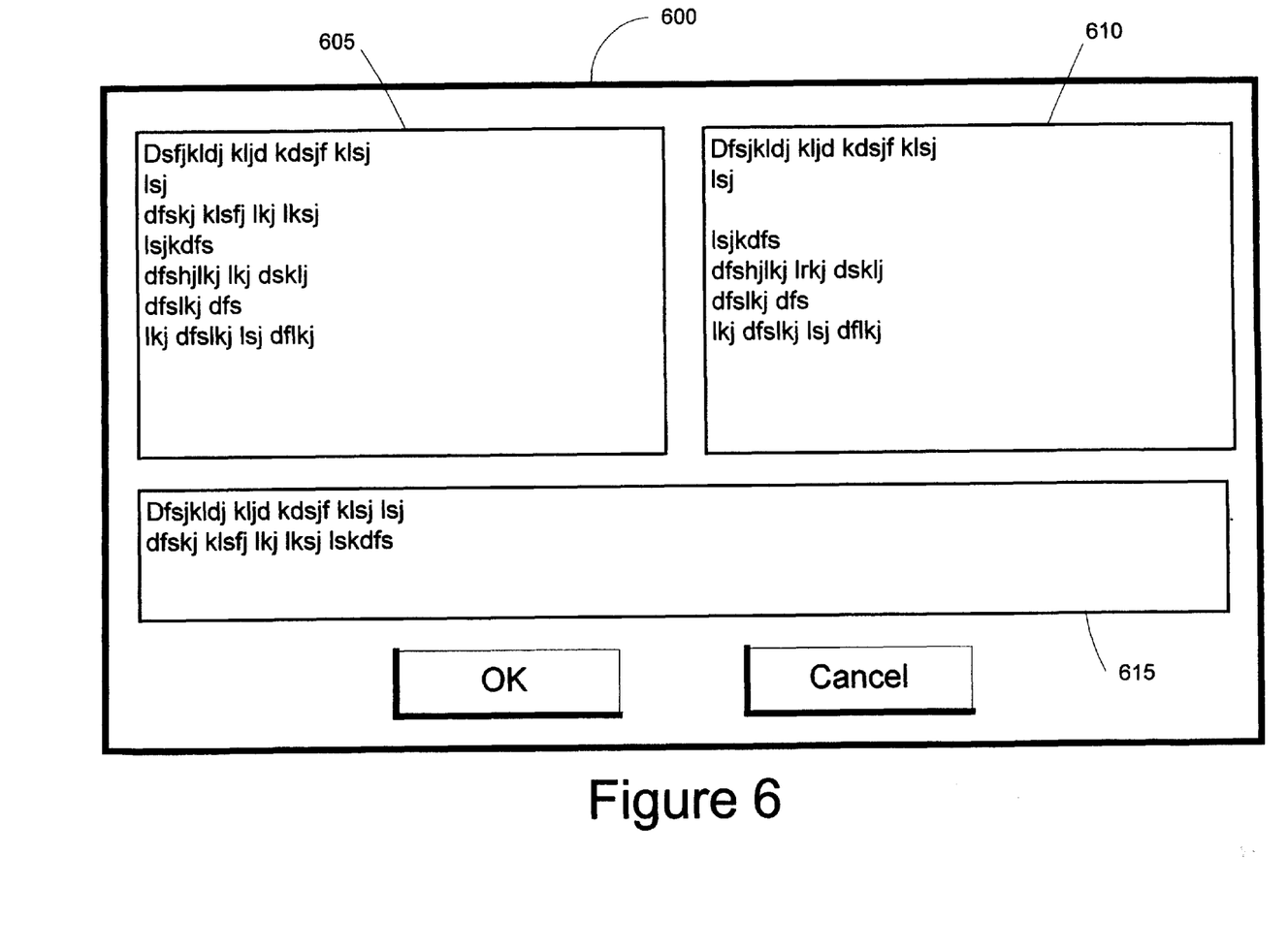
FIG. 6 depicts an example of a window which allows a developer to select which changes to a project file should prevail under the visual merge function of the present invention.

At step 545, in the case where the changes by the developers are conflicting, the project package 105 performs a "visual merge" function which allows the developer to easily identify the differences between the two versions and select which changes to save on the server 102. This can be achieved through a graphical user interface window 600 an example of which is shown in FIG. 6. The developer can thereby view the changes that were made in the two versions in windows 605 and 610 and select which change prevails. The prevailing changes are then displayed in window 615. Referring back to FIG. 5 at step 540, the prevailing changes are then written to the file on the client computer working web storage 109, allowing the developer to remotely test the changes. The file is then ready to be checked in under known procedures. As part of checking in the file, the system performs an incremental compilation on the file and all linked files. If the linked file has been checked out, the copy residing on the server 102 is still revised. The linked file may also require a merge function to account for changes to that file by other developers.

The merge function and the visual merge function require three versions of the file, namely the latest version as saved on the server 102 by the first developer, the version representing the second developer's modifications, and the original version that both developers started with. Working web storage 109 has an original file cache (not shown) such that whenever a developer checks out or gets a working copy of a file, an original copy is always cached in case a merge function is later necessary. The merge function identifies the differences between the original file and one version of the edited file and identifies the differences between the original file and the other version of the edited file. The two differences are then compared to determine whether they conflict. If the differences do not conflict, they are automatically merged as described above. If they do conflict, then the visual merge function is performed as also described above.

A project file may have others files within that project which link to the project file. Thus, when a developer makes changes to a project file, corresponding changes or fix-ups may also be required in the linked files. For example, if the name of a project file is changed, other project files that link to that edited project file will require a link fix-up to account for the name change.

In isolated mode, the link fix-up procedure is performed by the client/server interface 108. The link fix-ups are initially made to the project files stored in the working web storage 109 thereby allowing the developer to test and debug his/her changes to the project file. Corresponding link fix-ups are then made by the server extension 111 when the edited project file is checked into the master web storage 112. In the case where there is a substantive change such as a file rename, a link fix-up must occur to both the master web storage 112 and working web storage 109. Substantive changes are described further herein. In the case where a linked project file requires a link fix-up on the working web storage 109 but a read-only version of the file exists on the working web storage 109, a link fix-up is nonetheless performed on the read-only version of the project file. If the developer subsequently checks-out the linked file, the checked out file will then be fixed-up. Where no copy of the linked file exists locally, a link fix-up cannot be performed. The developer when testing the links to the edited file via the linkview 104 will be notified that the linked file has not been fixed-up.

In isolated mode, a link fix-up may vary depend upon the type of change (i.e., substantive or non-substantive). A substantive change is one that affects the name space of the file. Substantive changes are ones that are not contained within the content of a file so that the changes cannot be changed on the file. For example, a rename or a delete operation on a file is a substantive change. A substantive change therefore requires a connection to the server 102 such that the substantive change may immediately perform the link fix-up procedure to the files in the master web storage 112. A nonsubstantive change is a change that may be recorded in the file. For example, if a BOT was changed within a project file, the information necessary to carry out the link fix-up procedure relating to that changed would be contained within that file.

Figure 7:
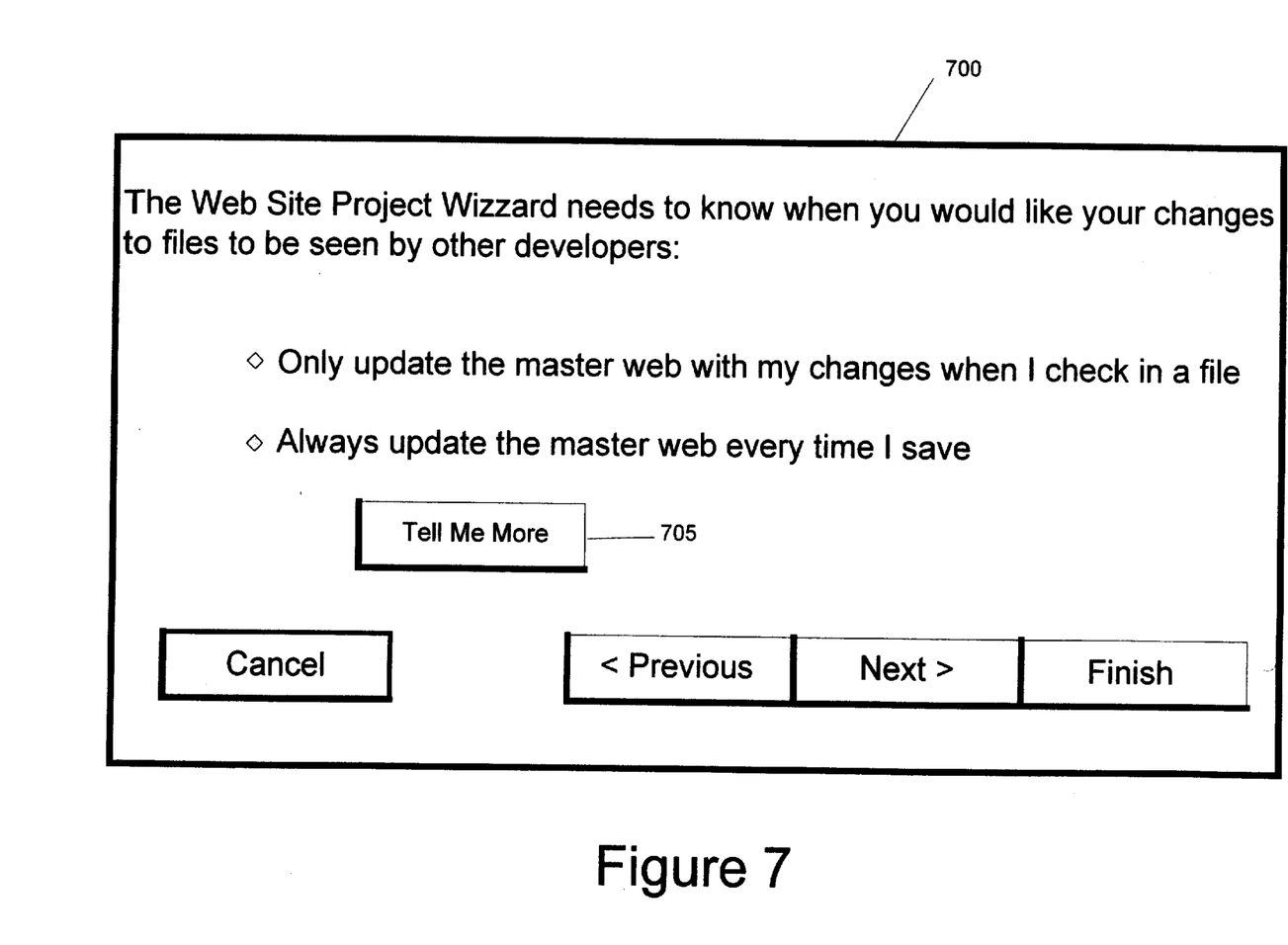
FIG. 7 depicts an example of a window for allowing a developer to select whether to the present invention should operate in direct or isolated mode.

In addition to the isolated mode of operation, the present invention is also suited to operate in a direct mode whereby the developer may save edited files directly on the server 102. The direct mode operates much like existing versions of Visual InterDev 1.0. The developer may select the mode of operation at the start of a session and may switch modes at any time during a session. FIG. 7 depicts an example of a message window 700 that is provided to the developer to select the mode of operation when creating the project. The "Tell Me More" button 705 brings up help that describes more about the isolated and direct modes. For existing projects, the mode of operation may be selected from a the menu. The direct mode can generally operate in a manner similar to known IDE 115 techniques as performed in Visual InterDev 1.0 where project changes are stored immediately on the server 102. Link fix-ups for example are performed directly on the files in the master web storage 112 by the sever extension 111. Under this mode, developers may not concurrently check out the same project files when a source code control system is present on the server 102. In systems where a source code control system is not present, there is no such restriction.

Under isolated mode, the client computer 101 does not communicate with the server 102 unless the developer performs an operation that requires contact with the master server 102 such as checking-in or checking-out a file or performing a refresh command. The refresh command is described in further detail below. In isolated mode, the developer remotely saves and tests changes to project files by operating exclusively under the working web storage 109. To allow the developer to remotely test changes to project files, the client computer 101 may have a client web server 175 to properly preview files that require server processing such as, for example, active server pages (ASPs). In this case, the application root of the client web server 175 is set to point to the working web storage 109 so that the developer may test or preview an ASP via HTTP. The application root is a specific feature of the IIS version of the web server 110 which generally is a directory within the client web server 175 containing general information about ASPs of a project. If a developer attempts to preview one or more files and if a web server 110 exists on the client computer 101, the application root is checked so that it is pointing to the working web storage 109. The desired files are then loaded to the client web server 175 from the client/server interface 108 via HTTP. The client/server interface 108 retrieves the files from the working web storage 109.

General differences in operation between the direct mode and isolated mode are described in the following table:

|  | Isolated | Direct |
| --- | --- | --- |
| When do files get saved back to the master web storage 112? | When the developer releases or checks-in the file | When the developer saves the file |
| Where is link information and other metadata for the project and local files retrieved? | Working web storage 109 | Master web storage 112 (mostly) |
| Where does the browser point when previewing files? | Working web storage 109 | Master web storage 112 |
| When the developer opens a file, which copy is used? | The copy in the working web storage 109 | Working we storage 109 which copies the file from the master web storage 112 |
| When new files are added, where do they get copied to? | The working web storage 109 only (orphans) | The master web storage 112 and working web storage 109 |

In direct mode, link information and other metadata for the project is generally retrieved from master web storage 112. In cases where one or more project files exist on the client 101 but not on the master web storage 112, this information would be retrieved from the working web storage 109 instead.

The developer may also choose to work offline in cases where the server 102 is down or unavailable or the developer seeks to physically detach the client computer 101 from the network to work remotely or at home. The offline mode operates in a manner similar to the isolated mode except that in the offline mode the server 102 is never contacted and any commands requiring contact with the server 102 are disabled. Commands requiring contact with the server 102 include, but are not limited to, Rename or Move commands on files and information relating to files that exist on the master web storage 112 but not on the working web storage 109. Other functions in the offline mode may subsequently require the developer to take additional steps in the future. For example, in the case where a developer creates a new file in the offline mode, the file will be an orphan file, namely the file will not be on the master web storage 112. To add this file to the server 102, the developer must request that the file be added to the master web storage 112 when the developer is in isolated or direct mode. This behavior in the above case is true for isolated mode as well.

The developer may switch between isolated and direct modes at any time by changing the corresponding property on the menu. When switching from direct mode to isolated mode, the client computer 101 first retrieves copies of all files that were checked out but not present in the working web storage 109. These copies are thereby available locally in case the developer subsequently desires to work offline. The client computer 101 then begins to operate in isolated mode as described herein. When switching from isolated mode to direct mode, the developer is prompted to update and save any changed files from the working web storage 109 to the master web storage 112. If the developer chooses not to update the master web storage 112, the client computer 101 will remain in isolated mode. If the developer chooses to update the master web storage 112, the client computer 101 then performs a refresh command to ensure that the working web storage 109 mirrors the master web storage 112. The client computer 101 then begins to operate in direct mode as described herein.

The refresh command generally updates the local directory structure of the working web storage 109 to mirror the master directory structure of the master web storage 112 and cache metadata regarding the files that are in the project. The project package 105 initiates the refresh command by instructing the client/server interface 108 to retrieve directory information of the master directory from the master web storage 112. This information is thereby retrieved from the server extension 111 and used to update the local directory of the working web storage 109. The local directory may still have information about files on the working web storage 109 that is not shown in the master directory of the master web directory 112. The refresh command thereby modifies, adds, deletes and/or renames files and folders in the local directory. In the case where a file is deleted from the server 102, the file is also deleted from the local directory. Where a file is renamed, the original file in the local directory is removed and replaced with the renamed file.

The local cache of the client computer 101 serves to track metadata about the files in the working web storage 109, the state of these files and the files that were on the server 102 the last time the refresh command was performed. The local cache stores the directory structure and a list of all the files that were in the project when the last refresh command was executed. This allows the developer to view the files in the project even if the developer does not have local copies of the files. For local files, the cache also tracks when the file was last updated and whether the user intends to edit the file. The cache is preferably stored in a file in the same directory and has the same name (but with different extensions) as the project file. The developer is therefore able to view in the project window 300 all of the files of a project regardless of whether they are stored in the master web storage 112 or the working web storage 109. Each file has a corresponding project glyph to show the file's status and type. This allows the developer to conveniently view on a single screen pertinent information regarding the files within a project.

Advantageously, the present invention allows developers to more productively build and develop software applications. By working in the isolated mode, developers may remotely test edited files before they are saved on the server. The client computer 101 mirrors server side operations to allow the developer to locally modify and test a project. The present invention allows associate files that are linked to an edited file to be fixed-up or changed locally to reflect the changes to the edited file in the linked file(s). The client computer simulates the computing environment that is similar to that of the server. By working offline, developers may detach their computers from the network to work remotely at home or away from the office. The present invention also provides a way of allowing multiple developers to concurrently check out and edit the same file. One embodiment of the present invention incorporates a merge function to accommodate for the changes by both developers.

It will be apparent to those skilled in the art that application of the present invention need not merely be utilized in conjunction with the Internet. It is also envisioned that the techniques of the present invention apply to any network using HTTP, including HTTPS compliant networks, intranets and extranets. It is further envisioned that the techniques of the present invention apply to any client/server network that is suited for multi-user sharing of files or documents whether or not it uses HTTP. For instance, the present invention may also be implemented in a peer-to-peer computing environment or in a multi-user host system having a mainframe or a minicomputer. Thus, the computer network in which the invention is implemented should be broadly construed to include any client/server computer network from which a client can retrieve a remote document on a server (even if that document is available on the same machine or system).

In the foregoing specification, the present invention has been described with reference to specific exemplary embodiments thereof. Although the invention has been described in terms of a preferred embodiment, those skilled in the art will recognize that various modifications, embodiments or variations of the invention can be practiced within the spirit and scope of the invention as set forth in the appended claims. All are considered within the sphere, spirit, and scope of the invention. The specification and drawings are, therefore, to be regarded in an illustrated rather than restrictive sense. Accordingly, it is not intended that the invention be limited except as may be necessary in view of the appended claims.

What is claimed is:

1. A method of merging a first file and a second file, said first file and said second file being modified versions of an original file, said method comprising the steps of:
   (a.) comparing said first file with said original file and producing a first differences log, wherein said first differences log identifies the differences between said first file and said original file;
   (b.) comparing said second file with said original file and producing a second differences log, wherein said second differences log identifies the differences between said second file and said original file;
   (c.) comparing said first differences log and said second differences log to identify portions of said first file which are in conflict with said second file and producing a conflicts log; and
   (d.) prompting a developer to select those differences from said conflicts log that are to be applied to modify said original file.

2. The method of claim 1, further comprising the step of incorporating those differences identified in said first differences log and the differences identified in said second differences log but which are not in said conflicts log into a third file.

3. The method of claim 1, wherein said steps are performed in a client computer operating within a client/server computing environment.

4. The method of claim 1, wherein said steps are performed in a server computer operating within a client/server computing environment.

5. A server computer capable of being operatively coupled to a client/server network comprising in combination:
   (a.) means for checking-out at least two copies of a file from said server computer,
   (b.) means for checking-in at least two modified versions of said file to said server computer; and
   (c.) means for performing a merge of the at least two modified versions to form a merged file if more than one of the at least two modified versions are checked-in from different client computers, wherein a merge function performed by said means for performing a merge checks for conflicts between the modified versions, prompts a developer at said server computer to select which modifications are to be applied, and applies the selected modifications to form said merged file.

6. The server computer of claim 5, wherein said client/server network is an Internet.

7. The server computer of claim 5, wherein said client/server network is an HTTP-compliant network.

8. The server computer of claim 5, wherein said client/server network is an HTTPS-compliant network.

9. The server computer of claim 5 further comprising means for making appropriate changes to at least one linked file of said modified file.

10. The server computer according to claim 5, wherein said means for checking-in further comprises:
- a first file storing one of said at least one modified version of said file; and,
- a second file storing another of said at least one modified version of said file.

11. In a client/server network having a server computer and a client computer, said server computer having stored therein a software project having a plurality of project files, wherein the project files are part of a directory structure and wherein at least one project file is linked to at least one other project file within said software project, a method of editing said project file in said client computer comprising the steps of:
- storing in said client computer file information relating to said software project;
- checking-out at least two project files from said server computer to form checked-out files in said client computer, wherein a first of said checked-out project files is linked to at least one other checked-out file;
- storing in said client computer at least on file from said software project, wherein the number of files in said client computer is fewer than the number of files for said software project;
- modifying at least one of said checked-out files in said client computer to form at least one modified project file; and
- using said file information in said client computer to locally debug said modified project file.

12. The method of claim 11, wherein said step of using said file information includes the step of fixing-up said other checked-out file that is linked to said modified project file in accordance with changes reflected in said modified project file to form at least one fixed-up file in said client computer.

13. The method of claim 11, wherein said step of storing file information includes the step of storing file information selected from the group consisting of metadata, link information, and BOT replacement.

14. The method of claim 11, wherein said client computer and said server computer communicate over a network selected from the group consisting of an HTTP-compliant network and an HTTPS-compliant network.

15. The method of claim 11, including the additional step of merging said modified file with said project file in said server computer to form a merged file.

16. The method of claim 15, including the additional step of fixing-up said at least one linked file in said server computer in accordance with changes reflected in said merged file.

17. The method of claim 11, wherein said step of using said file information comprises the step of saving said modified project file and said at least one fixed-up file in a working storage medium that has a file directory structure that parallels a file directory structure of a master directory structure in said server computer.

18. The method of claim 11, wherein said software project relates to a web site, said project file corresponds to a web page and said at least one linked file corresponds to at least one hyper-linked web page.

19. The method of claim 18, wherein said step using said file information comprises the step of previewing said web page and said at least one hyper-linked web page.

20. A computer readable medium having computer-executable instructions for performing the steps recited in claim 11.

21. A method of testing and debugging a file of a software project comprising the steps of:
- storing in a client computer file information relating to the software project in a server computer;
- checking-out at least two project files from said server computer to form checked-out files in said client computer, wherein a first checked-out project file is linked to at least one other check-out file;
- storing in said client computer at least one file from said software project, wherein the number of files in said client computer is fewer than the number of files for said software project;
- modifying at least one of said first checked-out file in said client computer to form at least one modified project file; and
- using the file information in said client computer to fix-up said other checked-out project file that is linked to said modified project file in accordance with changes reflected in said modified project file to form at least one fixed-up file in said client computer.

22. A client/server network for allowing multiple developers to share a software project, comprising in combination:
- a server computer having stored therein said software project, wherein said software project has a plurality of project files and wherein at least one project file is linked to at least one other project file within said software project;
- a client computer having stored therein a checked-out copy of at least one of said project files and file information relating to said software project providing directory structure information of said project files stored in said server computer, wherein the number of project files in said client computer is fewer than the number of total project files for said software project; and
- a communication medium operatively coupling said server computer to said client computer.

23. The system of claim 22, wherein the file information further includes information selected from the group consisting of metadata, link information, and BOT replacement.

24. The system of claim 22, wherein the client computer further comprises a working web storage for storing a copy of said project file and a client/server interface for communicating with other computers.

25. A client/server network for allowing multiple developers to share a software project, comprising in combination:
- a server computer having stored therein said software project, wherein said software project has a plurality of project files and wherein at least one project file is linked to at least one other project file within said software project;
- a client computer having stored therein a checked-out copy of at least one of said project files and file information relating to said software project, wherein the number of project files in said client computer is fewer than the number of total project files for said software project, wherein the client computer further comprises means for checking-out said project files from said server computer, means for locally editing said checked-out copy of said project file, means for locally fixing-up said project files that are linked to said checked-out copy based on changes to said checked-out copy, and means for locally testing said checked-out file and said copy; and a communication medium operatively coupling said server computer to said client computer.

26. The system of claim 25, wherein said means for locally editing includes an Integrated Development Environment.

27. The system of claim 25, wherein said means for locally editing includes a client/server interface.

28. The system of claim 25, wherein said means for locally editing and means for locally fixing-up may operate during periods where a connection from said client computer to said server computer is unavailable.

29. The system of claim 22, wherein the server computer further comprises a master web storage for storing master copies of said software project and a server extension which communicates with said client computer to check said project files into and out of said master web storage.

30. The system of claim 22, wherein said server computer further comprises a source code control system coupled to said server extension wherein said server extension transfers said files to said source code control system when exclusive access to said files is requested.

31. The system of claim 22, wherein said server computer has means for transferring a read-only copy of said files from said source code control system.

32. The system of claim 22, wherein said communication medium is selected from the group consisting of an Internet, an HTTP-compliant network and an HTTPS-compliant network.

33. A client computer capable of being operatively coupled to at least one server through a network comprising:
   a network interface over which files are retrieved;
   a processor requesting a first set of files to be modified from said server, said processor receiving said first set of files to be modified and a second set of files linked with said first set of files; and
   a storage device storing the first and second set of files, wherein the first and second set of files is fewer than the total number of files for said software project, and file information relating to said software project providing directory structure information of said total files for said software project.

34. A client computer capable of being operatively coupled to at least one server through a network comprising in combination:
   a network interface over which files are retrieved;
   a processor requesting a first set of files to be modified from said server, said processor receiving said first set of files to be modified and a second set of files linked with said first set of files;
   a storage device storing the first and second set of files, wherein the first and second set of files is fewer than the total number of files for said software project, and file information relating to said software project; and
   means for modifying said first set of files and creating a modified set of files based on file information relating to said software project.

35. The client computer of claim 33, wherein the file information further includes information selected from the group consisting of metadata, link information, and BOT replacement.

36. The client computer of claim 33, wherein said interlinked project includes a web site accessible over said network.

37. The client computer of claim 33 further comprising means for transferring said modified file into said server computer.

38. The client computer of claim 33 further comprising means for testing said modified file and said at least one linked file.

39. The client computer of claim 33 further comprising means for operating in an isolated mode.

40. The client computer of claim 33 further comprising means for operating in an offline mode.

41. A method of testing and debugging a file of a software project comprising the steps of:
   storing in a client computer a local directory structure of files and folders that generally mirrors a directory structure of said software project in a server computer;
   checking-out at least two project files from said server computer to form checked-out files in said client computer, wherein a first checked-out project file is linked to at least one other check-out file;
   storing in said client computer at least one file from said software project, wherein the number of files in said client computer is fewer than the number of files for said software project;
   modifying at least one of said first checked-out file in said client computer to form at least one modified project file; and
   using said local directory structure in said client computer to fix-up said other checked-out project file that is linked to said modified project file in accordance with changes reflected in said modified project file to form at least one fixed-up file in said client computer.

42. A client/server network for allowing multiple developers to share a software project comprising in combination:
   a server computer having stored therein said software project, wherein said software project has a master directory structure of project files and wherein at least one project file is linked to at least one other project file within said software project;
   a client computer having stored therein a checked-out copy of at least one of said project files and file information relating said software project; and
   a communication medium operatively coupling said server computer to said client computer.

43. A client computer capable of being operatively coupled to at least one server through a network comprising:
   a network interface over which files are retrieved, wherein said files are part of a software project;
   a processor requesting a first set of files to be modified from said server, said processor receiving said first set of files to be modified and a second set of files linked with said first set of files; and
   a storage device storing said first and second set of files, wherein said first and second set of files is fewer than the total number of files for said software project, and file information relating to said software project selected from the group consisting of metadata, link information, and BOT replacement.

44. The client computer of claim 43, wherein files listed in said local directory structure have a designation of status and type.

45. The client computer of claim 43, wherein said designation of status uses at least one glyph.

46. The client computer of claim 43, wherein said designation of status is selected from the group consisting of a ghosted, source code controlled, orphaned, checked-out, read-only, and working version.

47. The client computer of claim 43, wherein said designation of type is selected from the group consisting of folder, web page, active server page, and hypertext markup language page.

* * * * *